(12) United States Patent
Yamada et al.

(10) Patent No.: US 6,414,705 B1
(45) Date of Patent: Jul. 2, 2002

(54) OPTICAL PRINTING APPARATUS

(75) Inventors: Keiki Yamada; Ichiro Furuki, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/545,006

(22) Filed: Apr. 6, 2000

(30) Foreign Application Priority Data

May 11, 1999 (JP) .......................................... 11-129995
Feb. 10, 2000 (JP) ...................................... 2000-033603

(51) Int. Cl.[7] .............................. B41J 2/435; B41J 2/47
(52) U.S. Cl. ...................................... 347/232; 347/238
(58) Field of Search ................................ 347/237, 238, 347/247, 253, 130, 240, 252; 355/35; 349/33; 359/204; 250/226; 430/363

(56) References Cited

U.S. PATENT DOCUMENTS

| | | | | |
|---|---|---|---|---|
| 4,639,127 A | * | 1/1987 | Beery et al. ................... 355/35 |
| 5,191,454 A | * | 3/1993 | Iijima et al. .................. 349/33 |
| 5,457,007 A | * | 10/1995 | Asami ........................ 430/363 |
| 5,753,906 A | * | 5/1998 | Gennetten .................... 250/226 |
| 5,790,238 A | * | 8/1998 | Ishikawa et al. ............... 355/35 |
| 6,055,084 A | * | 4/2000 | Shiraishi et al. ............ 359/204 |

FOREIGN PATENT DOCUMENTS

| | | |
|---|---|---|
| JP | A62134629 | 6/1987 |
| JP | A7256928 | 10/1995 |

* cited by examiner

*Primary Examiner*—Hai Pham

(57) ABSTRACT

In an optical printing apparatus for selectively exposing light with respect to a photosensitive recording medium to thereby form a gradation image thereon, there are provided; image data input device for entering more than 4 colors of spectral image data; storage device for storing thereinto the entered spectral image data in the unit of either 1 screen or 1 line; an optical head for outputting more than 4 sorts of light having different wavelengths from each other; and head driving device for converting the stored spectral image data into predetermined exposure time periods, and turning ON the more than 4 sorts of light so as to ON/OFF-drive the optical print head. As a result, this optical printing apparatus is capable of performing a high image quality recording operation. More specifically, a realistic image having a material feeling is formed.

20 Claims, 17 Drawing Sheets

| IMAGE DATA | EXPOSURE TIME PERIOD ($\mu s$) |
|---|---|
| 0 | 0 |
| 1 | 50 |
| 2 | 70 |
| 3 | 90 |
| ⋮ | ⋮ |
| 128 | 1280 |
| ⋮ | ⋮ |
| 253 | 2530 |
| 254 | 2540 |
| 255 | 2550 |

| IMAGE DATA BEFORE CONVERSION | IMAGE DATA AFTER CONVERSION |
|---|---|
| 0 | 0 |
| 1 | 5 |
| 2 | 7 |
| 3 | 9 |
| ⋮ | ⋮ |
| 128 | 128 |
| ⋮ | ⋮ |
| 253 | 253 |
| 254 | 254 |
| 255 | 255 |

OPTICAL PRINTING APPARATUS

BACKGROUND OF THE INVENTION

1. Field of the Invention

The present invention generally relates to an optical printing apparatus for exposing light onto a photosensitive recording medium to form a gradation image. More specifically, the present invention is directed to such an optical printing apparatus. That is, while one column, or plurality of columns constituted by self-light emitting elements (e.g., LEDs and ELs), or light transmission control elements (e.g., liquid crystal shutter elements) or reflective elements (e.g., micro mirror elements) are arranged as a print head, the respective elements are independently controlled in response to image data so as to print out a gradation image in the optical printing apparatus.

2. Description of the Related Art

Various sorts of optical printing apparatuses have been developed as apparatuses employing instant films and simultaneous color paper, and are commercially available in the markets. In these optical printing apparatuses, light is exposed onto photosensitive recording media so as to form gradation images.

A conventional optical printing apparatus will now be explained with reference to a drawing. FIG. 22 is a perspective view for schematically indicating a structure of a print head used in one conventional optical printing apparatus as disclosed in, for instance, Japanese Patent Application Laid-open No. 7-256928.

In FIG. 22, white light emitted from a light source 5 is separated into red-colored light, green-colored light, and blue-colored light by way of a color liquid crystal (LCD) shutter 100. The R, G, B-colored light is continuously irradiated onto an edge surface of an acrylic rod 6 in a time shift manner. In this print head, the acrylic rod 6 is covered with a reflection foil on which aluminum and the like are vapor-deposited except for a light emitting plane thereof. Thus, this acrylic rod 6 owns such a function capable of effectively converting light entered from a rod edge surface into line-shaped light. As a result, the red line-shaped light, the green line-shaped light, and the blue line-shaped light are continuously irradiated onto a black/white shutter array 7 in a time shift manner.

In this case, 3 columns of pixel arrays corresponding to the red light, the green light, and the blue light are provided inside the black/white shutter array 7. These pixel arrays are driven in such a manner that only designated color light can pass therethrough. For example, when the red line-shaped light is irradiated, this red line-shaped light can pass through only one pixel array corresponding to the color light, whereas the other two pixel arrays are kept under shield condition. Then, the red line-shaped light, the green-shaped light, and the blue line-shaped light, which are modulated by the black/white shutter 7 are focused on a photosensitive paper such as the spectra instant film manufactured by Polaroid Inc., by using a SELFOC lens array 9 (namely, tradename of converging lens array). At this time, since the photosensitive paper is relatively transported with respect to the black/white LCD shutter array 7, the red line-shaped light, the green line-shaped light, and the blue line-shaped light are sequentially exposed onto the same place on the photosensitive paper. As a result, a two-dimensional print image can be obtained.

As previously described, since only three sorts of spectral image data (namely, red colordata, green color data, and blue color data) are exposed in the conventional optical printing apparatus, the following problem occurs. That is, the conventional optical printing apparatus can hardly print out the images having high image qualities, and especially form realistic images having material feelings.

Also, in the case that the light source or the self-light emitting elements with the narrow light band is employed in such a conventional optical printing apparatus, since the exposure wavelength range is narrow, there is another problem. That is, it is practically difficult to form the realistic images having material feelings, and also to perform the high image quality recording operation.

SUMMARY OF THE INVENTION

The present invention has been made to solve the above-explained problems of the conventional optical printing apparatus, and therefore, has an object to provide such an optical printing apparatus capable of forming an image by using more than 4 sorts of spectral image data. Also, another object of the present invention is to provide such an optical printing apparatus capable of realizing a high image quality recording operation by exposing color light onto a printing material by employing a plurality of light beams having different peak wavelengths within the same color system even when three sorts of spectral image data are used in the exposure operation. In particular, realistic images having material feelings can be formed by this optical printing apparatus.

To achieve the above-described objects, an optical printing apparatus, according to a first aspect of the present invention, is featured by such an optical printing apparatus for selectively exposing light with respect to a photosensitive recording medium to thereby form a gradation image thereon, comprising: image data input means for entering more than 4 colors of spectral image data; storage means for storing thereinto the entered spectral image data; an optical print head for outputting more than 4 sorts of light having different wavelengths from each other; and head driving means for converting the stored spectral image data into predetermined exposure time periods to drive the optical print head.

Also, an optical printing apparatus, according to a second aspect of the present invention, is featured by that the optical print head contains more than 4 sorts of light sources having different peak wavelengths from each other.

Also, an optical printing apparatus, according to a third aspect of the present invention, is featured by that the optical print head includes a white-light light source, and a color filter for penetrating therethrough more than 4-colors light emitted from the white-light light source.

Also, an optical printing apparatus, according to a fourth aspect of the present invention, is featured by that the optical print head includes a white-light light source, and an optical element for spectral-dividing the white light emitted from the white-light light source into more than 4-colors light.

Also, an optical printing apparatus, according to a fifth aspect of the present invention, is featured by that the optical print head includes self-light emitting elements arranged in an array shape in correspondence with the spectral image data.

Also, an optical printing apparatus, according to a sixth aspect of the present invention, is featured by that light emitted from an exposure light source is arranged in a stagger shape.

Furthermore, to achieve the above-described objects, an optical printing apparatus, according to a seventh aspect of the present invention, is featured by such an optical printing apparatus for selectively exposing light with respect to a photosensitive recording medium to thereby form a gradation image thereon, comprising: image data input means for entering more than 3 colors of spectral image data; storage means for storing thereinto the entered spectral image data; an optical print head containing a plurality of light sources having different peak wavelengths within the same color system; and head driving means for converting the stored spectral image data into predetermined exposure time periods to drive the optical print head.

Also, an optical printing apparatus, according to eighth and ninth aspects of the present invention, is featured by that the optical print head contains a TN (twisted nematic) type light transmission control element for selectively exposing the light with respect to the photosensitive recording medium.

Also, an optical printing apparatus, according to a tenth aspect of the present invention, is featured by that the optical print head for outputting a plurality of light beams having different peak wavelengths within the same color system has different light intensity levels.

BRIEF DESCRIPTION OF THE DRAWINGS

A more better understanding of the present invention may be made of reading a detailed description in conjunction with the accompanying drawings.

DETAILED DESCRIPTION OF THE PREFERRED EMBODIMENTS

EMBODIMENT MODE 1

Figure 1:
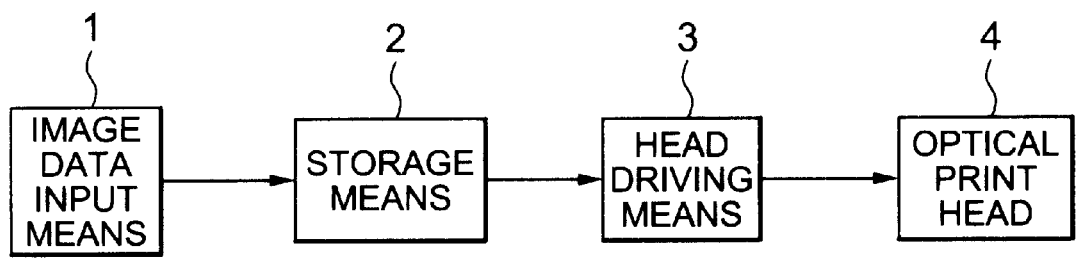
FIG. 1 is a schematic block diagram for showing an arrangement of an optical printing apparatus according to an embodiment mode 1 of the present invention.
Figure 2:
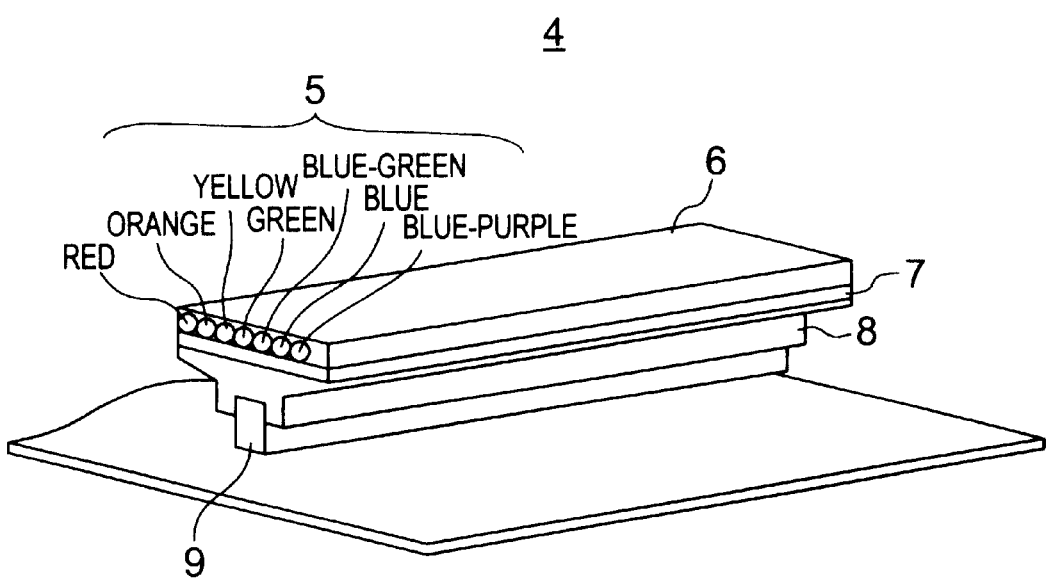
FIG. 2 is a diagram for representing a structure of an optical print head employed in the optical printing apparatus according to the embodiment mode 1 of the present invention.

Referring now to drawings, an optical printing apparatus according to an embodiment mode 1 of the present invention will be described. FIG. 1 is a schematic block diagram for indicating a basic arrangement of an optical printing apparatus according to this embodiment mode 1 of the present invention. FIG. 2 is an illustrative diagram for showing a structural example of the optical head provided in the optical printing apparatus according to the embodiment mode 1 of the present invention. It should be noted that the same reference numerals shown in the respective drawings indicate the same, or similar structural elements. Also, the above-explained basic structure may be similarly applied to other embodiment modes (will be discussed later).

In FIG. 1, reference numeral 1 indicates image data input means for inputting image data. For example, seven sorts of spectral image data are entered from such an external host computer (not shown) via this image data input means 1 into this optical printing apparatus. As a physical interface, the existing parallel interface regulated by U.S. Centronics Data Computer Inc, the serial interface such as RS232C, wired interfaces such as IEEE1394 and USB (Universal Serial Bus), and wireless interfaces such as infrared communications are utilized. It should also be understood that various sorts of data (pixel numbers, image data, etc.) are transmitted/received between the own optical printing apparatus and the above-explained external host computer (not shown) under control of control means (not shown) in a desirable sequence. For instance, the reception of the spectral image data is controlled together with commands by the control means (not shown) to be entered in a predetermined unit, e.g., either in the unit of 1 line or in the unit of 1 image.

Also, in FIG. 1, reference numeral 2 shows a storage means for storing thereinto spectral image data which is entered from the image data input means 1 in the unit of either 1 screen or 1 line. Reference numeral 3 indicates head driving means, and reference numeral 4 denotes an optical print head.

As the optical head 4, a light transmission control element capable of penetrating, or shielding light emitted from a light source, a self-light emitting element and the like may be employed. The head driving means 3 converts spectral image data corresponding to the output of the storage means 2 into exposure time equal to this spectral image data and then drives the optical print head 4. For instance, in such a case that 640 pieces of light transmission control elements (liquid crystal shutter elements) are provided in a line shape, 1-line image constructed of 640 pixels may be formed by selectively ON/OFF-driving (by controlling transmission time) the light emitted from the light source. Also, either the optical print head 4 or the photosensitive recording medium is relatively moved with respect to each other, so that a two-dimensional image can be formed.

In this case, as the above-described light transmission control element (liquid crystal shutter element), for example, twisted nematic (TN) type liquid crystal is sealed into glass plates, and furthermore, two sheets of polarization plates are arranged on both sides of the glass plates in such a manner that absorption axes thereof are shifted from each other by 90 degrees. In accordance with this liquid crystal shutter element, when no voltage is applied to this LCD shutter element, this shutter element is brought into a transmission (transparent) state, whereas when a voltage is applied thereto, this LCD shutter element is brought into a shielded state. Since the exposure time of this LCD shutter element can be controlled by controlling the voltage non-application time, images containing gradation characteristics can be formed. This structure will be referred to as a positive type liquid crystal shutter element structure.

On the other hand, a negative type liquid crystal shutter element structure is defined as such a structure that two sheets of polarization plates are arranged in such a manner that absorption axes thereof are located in parallel to each other. In accordance with this liquid crystal shutter element, when a voltage is applied to this negative type LCD shutter element, this shutter element is brought into a transmission (transparent) state, whereas when no voltage is applied thereto, this LCD shutter element is brought into a shielded state. Since the exposure time of this LCD shutter element can be controlled by controlling the voltage non-application time, images containing gradation characteristics can be formed. However, the transmittance of the negative type LCD shutter element during the shielded state is relatively larger than that of the positive type LCD shutter element, the contrast thereof is small, and also the gradation characteristic thereof is poor. As a consequence, the positive type LCD shutter element is preferable to the print head 4.

As to a sort of liquid crystal, there are nematic liquid crystal such as a TN type LCD and an STN type LCD, cholesteric liquid crystal, and smetic liquid crystal typically known as ferroelectric liquid crystal. As the desirable characteristics of the print head 4 mounted on the optical print apparatus, the following characteristic items are required: A high contrast ratio is required; a high response speed is required for a liquid crystal shutter element; a low drive voltage is required; and an anti-shock characteristic must become stable. As an overall evaluation result, it can be concluded that TN type liquid crystal is preferable among these elements. For instance, with respect to the contrast ratio, the TN type LCD can own the contrast ratio more than 10 times higher than that of the STN type LCD. As to the anti-shock characteristic, the TN type LCD becomes stable rather than the smetic LCD.

In FIG. 2, reference numeral 5 shows a light source. This light source 5 is constituted by, for example, a self-light emitting type point-shaped light source such as an LED (light emitting diode) and an EL (electroluminescent lamp), and is capable of emitting 7 colored lights, namely red, orange, yellow, green, blue-green (greenish blue), blue, and blue-purple. Reference numeral 6 shows a light conducting tube for uniformly indicating light on a plane of a liquid crystal shutter board (will be discussed later) 7 (equivalent to the above-described black/white LCD shutter array). This light conducting tube 6 is constructed of the above-explained acrylic rod and the like. Alternatively, the light conducting tube 6 may be covered with the above-explained aluminium vapor deposition, or a substance having a high reflectivity.

Furthermore, reference numeral 7 shows a liquid crystal shutter board on which, for example, 640 pieces of liquid crystal shutter elements (not shown) are arranged. In such a case that the light sources 5 are sequentially switched to be selectively used, this liquid crystal shutter board 10 may be arranged by a single column of LCD shutter array. When the LCD shutter elements correspond to these seven light sources, this liquid crystal shutter board 10 is constituted by 7 columns of LCD shutter arrays. Also, reference numeral 8 indicates a holder which may hold thereon the above-explained light conducting tube 6, liquid crystal shutter board 7, and a SELFOC lens array (tradename) 9. This holder 8 may be commonly used in combination with a housing (not shown) for shielding an entire portion.

Figure 3:
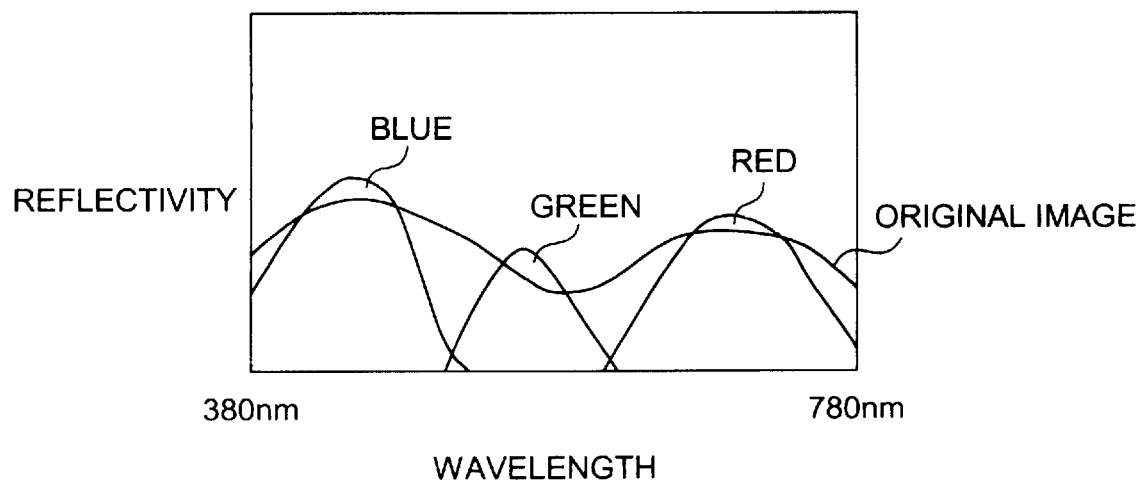
FIG. 3 is a graphic representation for showing a relationship between a wavelength of spectral image data and a reflectivity in the optical printing apparatus according to the embodiment mode 1 of the present invention.

Before describing operations of the optical printing apparatus according to this embodiment mode 1, shown in FIG. 1 and FIG. 2, the spectral image data which constitute a feature of the present invention will be explained with reference to FIG. 3 and FIG. 4.

First of all, a color may be recognized from light reflected from an object, but a color is not added to an object itself. Then, since light is one sort of electromagnetic waves, the light owns a nature of a wave and thus may be expressed by a wavelength. Colors which may be recognized by human eyes own wavelengths defined between 380 nm (nanometers) and 780 nm. Depending upon wavelengths, different colors such as red, green, and blue colors may be observed by human eyes.

Normally, in display devices such as a CRT (cathode-ray tube), a desirable color is represented by mixing red color, green, and blue with each other. Also, when a photosensitive recording medium and the like are exposed by color light to form a desirable image, red-colored light, green-colored light, and blue-colored light are employed so as to form such a desirable image. Precisely speaking, the image is formed in such a manner that the photosensitive recording medium is exposed by using the red-colored light, the green-colored light, and the blue-colored light so as to emit yellow-colored light, magenta-colored light, and cyan-colored light.

For example, when an orange color is represented, a red color is mixed with a green color. Similar to this color mixing manner, colors which may be recognized by human eyes are represented by using 3 sorts of red image data, green image data, and blue image data. However, since only three stimulus values of red, green, blue colors may correspond to a preselected color of a preselected image, there is such a problem that an absolute color representation of an original image cannot be represented by using only these 3 stimulus values. This is because the color characteristic of the original image can be hardly approximated by employing these 3 colors (red, green, blue), as indicated in a relationship between the reflectivity and the wavelength of FIG. 3.

Also, there are neither light sources, nor photosensitive recording media, which may be usually used, and may have ideal characteristics. In other words, these light sources and photosensitive recording media contain distortions that occurr in color mixtures (namely, characteristic in which a desirable color is shifted from an ideal color during color mixture). Therefore, it is difficult to form a realistic image by using only a red color, a green color, and a blue color.

To solve this problem, the following technical idea may be conceived. That is, while more than 4 sorts of spectral image data are entered, a desirable image is formed in response to these spectral image data, and thus, an absolute color representation of this original image may be realized.

It should be understood that the larger a total sort of spectral image data is increased, the more precise the realistic image is formed. Normally, 4 to 10 sorts of spectral image data are preferably employed, while considering the cost aspect. FIG. 4 is an illustration used to explain the above-mentioned contents of color representations.

Figure 4:
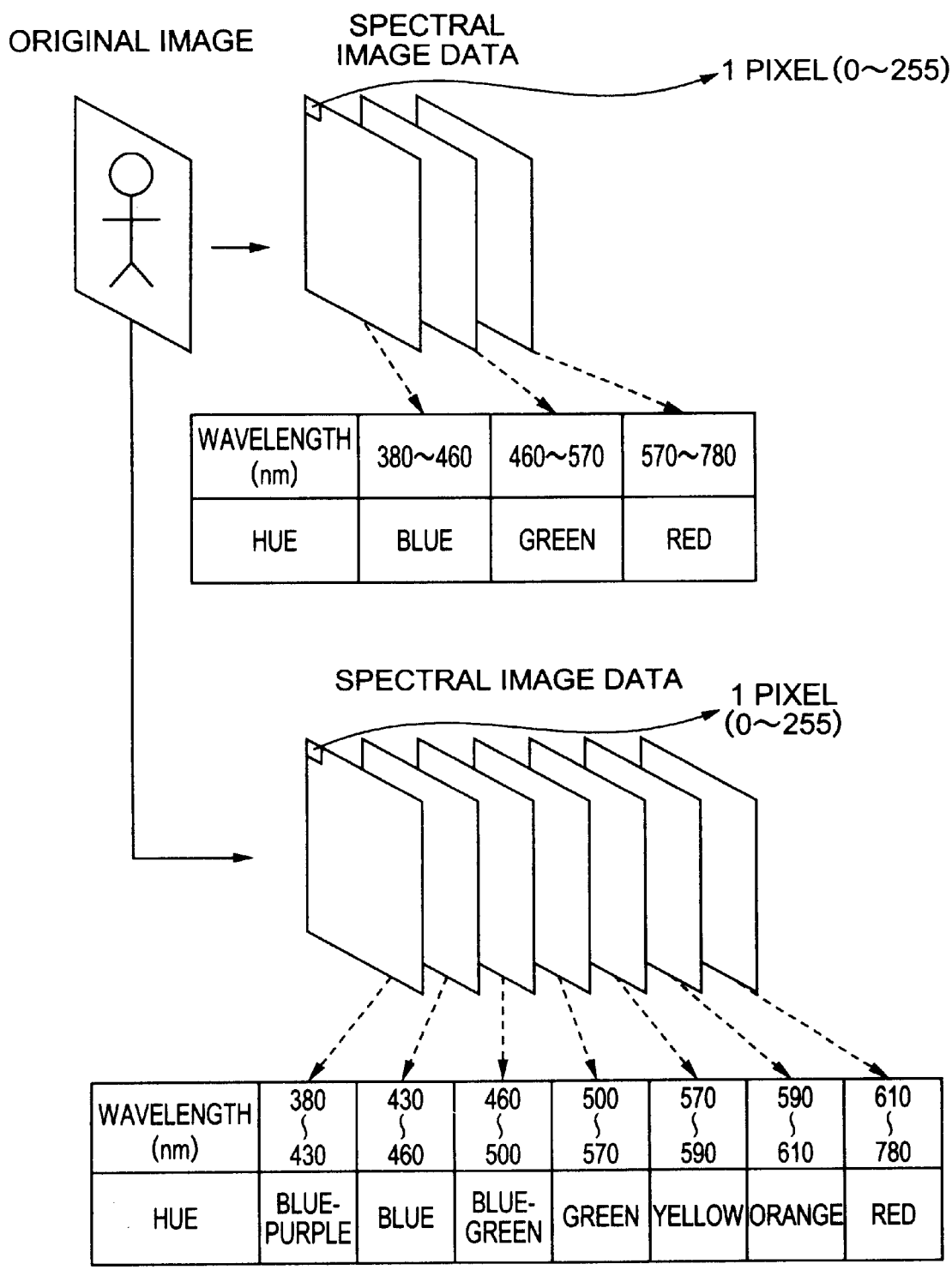
FIG. 4 is an illustration of the spectral image data in the optical printing apparatus according to the embodiment mode 1 of the present invention.

An upper illustrative portion of FIG. 4 indicates the conventional color representation condition. An original image is formed by using 3 sorts of image data (namely, red-colored image data, green-colored image data, and blue-colored image data). In this conventional case, as the 3 sorts of image data, for instance, a wavelength range defined between 380 nm and 460 nm is expressed by a blue color, a wavelength range between 460 nm and 570 nm is expressed by a green color, and a wavelength range between 570 nm and 780 nm is expressed by a red color. Then, a desirable image is formed by using 3 planes constructed of blue, green, and red-colored planes. In each of these 3 color planes, 1 pixel is represented by, for example, 8 bits defined from 0 to 255. Also, exposure time is varied based upon bit value thereof, so that an image having a better gradation characteristic is formed.

On the other hand, a lower illustrative portion of FIG. 4 indicates a color representation condition employed in the optical printing apparatus according to the present invention. An original image is formed by spectral image data constituted by 7 color planes in the following manner. For instance, color data in a wavelength range between 380 nm and 430 nm is approximated by blue-purple; color data in a wavelength range between 430 nm and 460 nm is approximated by blue; color data in a wavelength range between 460 nm and 500 nm is approximated by blue-green; color data in a wavelength range between 500 nm and 570 nm is approximated by green; color data in a wavelength range between 570 nm and 590 nm is approximated by yellow; color data in a wavelength range between 590 nm and 610 nm is approximated by orange; and color data in a wavelength range between 610 nm and 780 nm is approximated by red. Also, the respective pixels are formed by 7 sorts of spectral image data, namely 7 sorts of exposure operations corresponding to data. Since such a method is employed, it is possible to form a realistic image which is essentially similar to the original image.

Next, printing operation of the optical printing apparatus according to this embodiment mode 1 will now be described with reference to drawings.

In FIG. 1, first of all, spectral image data are inputted into the image data input means 1. These spectral image data correspond to red, orange, yellow, green, blue-green, blue, and blue-purple colors. These spectral image data are sequentially stored into the storage means 2 in response to an instruction issued from a control means (not shown). Then, the spectral image data stored in the storage means 2 are supplied to the head driving means 3 in response to an instruction issued from the control means (not shown) in such a supply order that the red-color data (equivalent to 640 pixels), the orange-color data, the yellow-color data, the green-color data, the blue-green-color data, the blue-color data, and also the blue-purple-color data.

Figure 5:
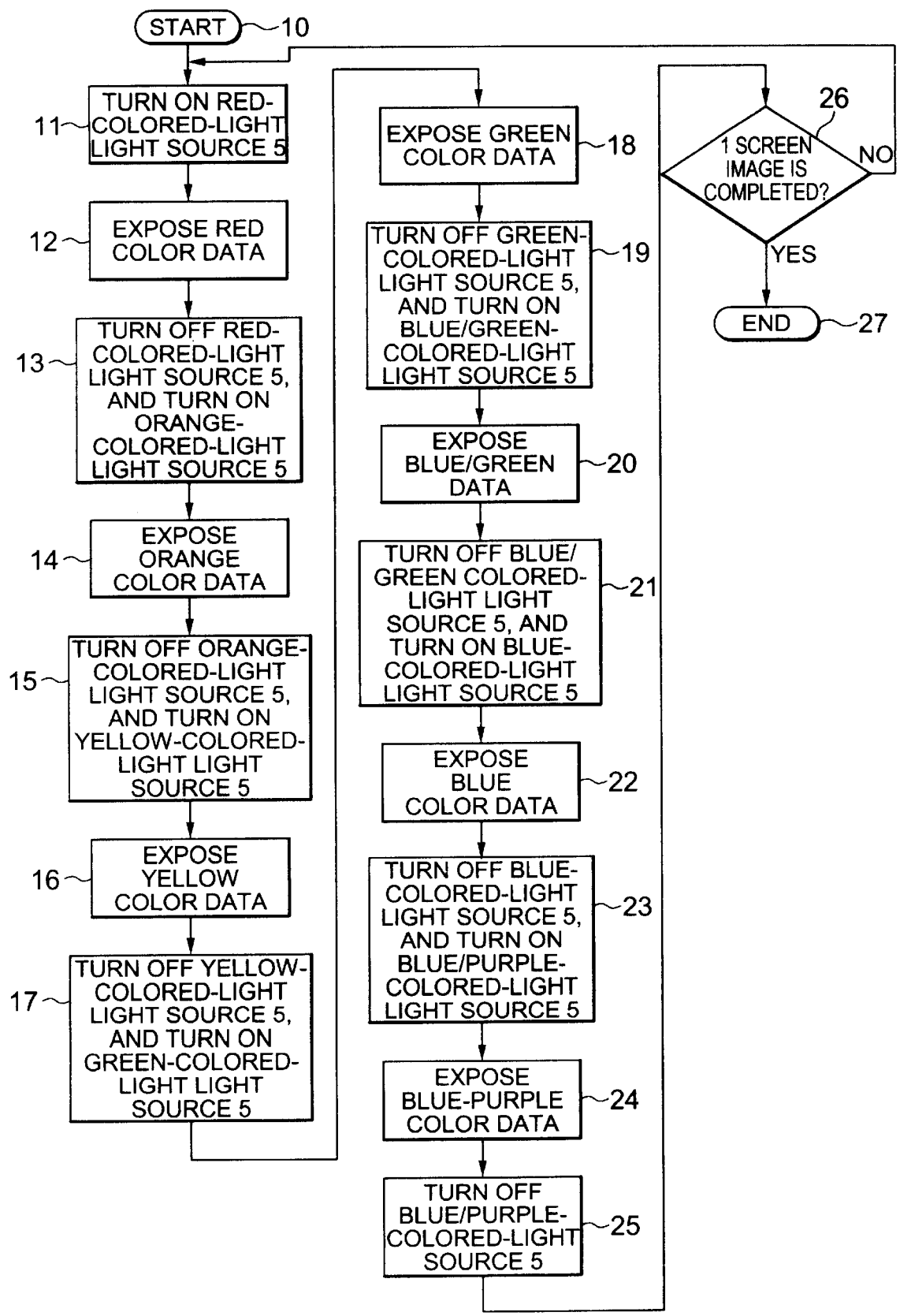
FIG. 5 is a flow chart for describing an operation of the optical printing apparatus according to the embodiment mode 1 of the present invention.

Next, the head driving means 3 converts the above-explained spectral image data into preselected exposure times periods, and ON/OFF-drives the optical print head 4 in response to the converted exposure periods. A concrete LCD shutter ON/OFF-driving operation is explained in a flow chart of FIG. 5 in the case that the LCD shutter board 7 is arranged by only one column of LCD shutter elements.

That is, in this sequential operation started from a first step 10, the red-colored-light light source 5 is turned ON so as to perform the exposure operation (namely, optical head 4 is ON/OFF-driven) in response to the red-color data at a step 12. Subsequently, this red-colored light source 5 is turned OFF and at the same time, the orange-colored-light light source 5 is turned ON (step 13) so as to perform the exposure operation in response to the orange-color data at a step 14. Then, the light sources 5 are switched from a step 15 to a step 25 in a similar manner in order to execute the exposure operations corresponding to the respective colors. Thus, the color exposure operation for 1 line is accomplished. Then, while a desirable printing operation is repeatedly carried out, an image for 1 screen may be formed at steps 26 and 27.

Figures 6A, 6B, 6C:
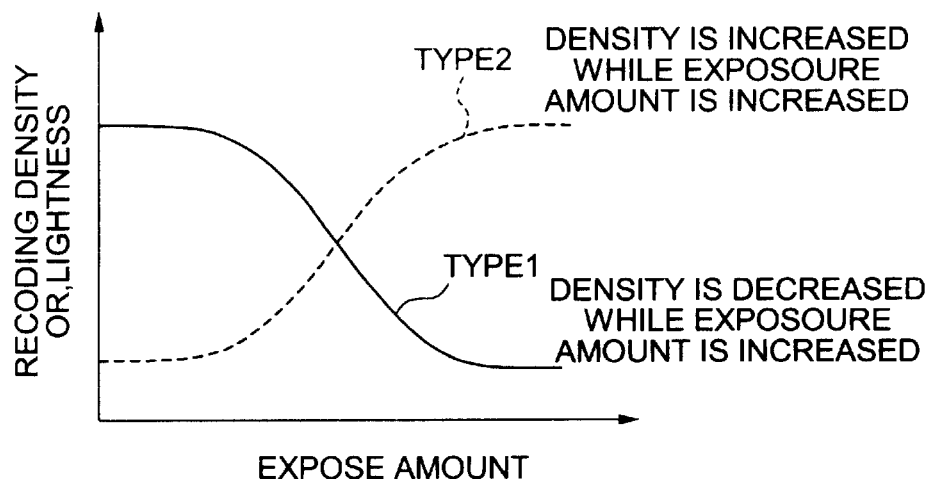
FIGS. 6A–6C are diagrams for showing a conversion table of a head driving means employed in the optical printing apparatus according to the embodiment mode 1 of the present invention.

A recording density characteristic of a photosensitive recording medium (not shown) normally owns such a characteristic (type 1, or type 2) shown in FIG. 6A with respect to an exposure amount (namely, exposure amount is defined by an amount of light penetrated through LCD shutter and light penetration time). As a result, when the exposure time is made constant to every data, the density of every data cannot become constant, so that the reproducibility of the highlight portion and also the shadow portion cannot be obtained.

As a result, while the exposure time is controlled at every gradation in order that the gradation characteristic represents linear characteristics, while a conversion table between data and exposure time is employed in the head driving means 3, as shown in FIG. 6B. Alternatively, while the exposure time is made constant, another conversion table for converting the data itself is provided in this head driving means 3, as indicated in FIG. 6C. In this case, when conversion tables are provided with respect to these 7 colors in accordance with characteristics of the photosensitive recording media, the optical printing apparatus of the present invention may perform higher image quality recording operations, as compared with the above case.

As previously described, in accordance with this embodiment mode 1, since more than 4 sorts of spectral image data are entered into the optical printing apparatus so as to form the desirable image in response to the spectral image data, there is such an effect that the high image quality recording operation can be carried out, especially, the realistic image having the material feeling can be printed out.

Figure 7:
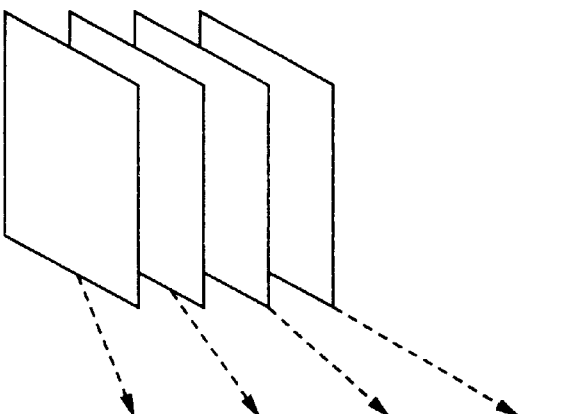
FIG. 7 is an illustration for showing another example of the spectral image data in the optical printing apparatus according to the embodiment mode 1 of the present invention.

It should be understood that various modifications, changes, and substitutions may be made in this embodiment mode 1 without departing from the technical spirit and scope of the present invention. For instance, in the above-described embodiment mode 1, the 7 sorts of spectral image data are entered. Alternatively, as indicated in FIG. 7, 4 sorts of such spectral image data may be employed, in which green color data constitutes the most important color data, since this green color may have the highest spectral luminous efficiency of human eyes.

Also, in the case that an image produced from an endoscope and the like is used as a main target, 5 sorts of spectral image data may be entered so as to form a desirable image. In these spectral image data, a red color and colors redish colors are handled as the most important color such as blue corresponding to a wavelength range between 380 nm and 460 nm; green corresponding to a wavelength range between 460 nm and 570 nm; and yellow corresponding to a wavelength range between 570 nm and 590 nm; orange corresponding to a wavelength range between 590 nm and 610 nm; and red corresponding to a wavelength range between 610 nm and 780 nm.

Furthermore, if more than 4 sorts of spectral image data may be employed in this optical printing apparatus, there is no limitation in the sort of spectral image data. More specifically, a relationship between a wavelength and a hue may be properly varied in connection with the above-explained example. For example, while a blue color may be set in a wavelength range between 380 nm and 500 nm, a green color may be defined in a wavelength between 460 nm and 570 nm. Also, the wavelength ranges may be overlapped with each other. Furthermore, the wavelength range may be shortened to a range between 400 nm and 700 nm.

Preferably, the relationship between the wavelength and the hue is determined based on the characteristic of the light source 5 and the spectral sensitivity of the photosensitive recording medium. This is because even when the photosensitive recording medium is exposed by such a wavelength corresponding to spectral image data obtained by solving the original image into a plurality of images, a desirable color can hardly be obtained. In this case, the wavelength of the light source and the exposure time period may be determined in such a manner that the spectral reflection characteristic of the finally obtained image may be made substantially coincident with the spectral image data.

Furthermore, there is such a case that infrared rays and ultraviolet rays may be used to expose a photosensitive recording medium so as to emit a desirable color. Alternatively, as the definition of the spectral image data, it is conceivable as characteristic data obtained on the photosensitive recording medium. In addition there is no limitation in the color exposing order. Therefore, this color exposing order may be properly changed. Furthermore, in such a case that a plurality of light sources 5 are employed, it is preferable to employ such optical light sources 5, at least the peak wavelengths of which are different from each other.

Also, as to the photosensitive recording medium, a plurality of layers that reacts to the respective hue may be provided. Alternatively, while the recording layer is made as a single layer, the recording layer portions contained in this single recording layer may react to the respective wavelengths. There is no limitation in the structure of this recording layer.

Figure 8:
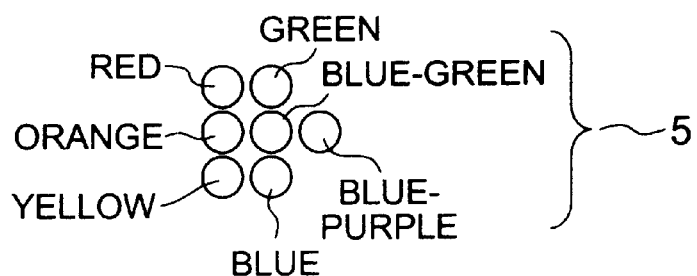
FIG. 8 is an illustration for representing another example of the light source employed in the optical printing apparatus according to the embodiment mode 1 of the present invention.

In addition, in the above-explained embodiment mode 1, while the light source 5 is employed, the optical print head 4 is irradiated from a single side surface of this print head 4. Alternatively, the print head 4 may be irradiated from either both side surfaces thereof or an upper side surface thereof, and the present invention is not limited thereto. When both sides of the optical head 4 are irradiated, the light distribution may be made uniform and the light amount is increased, as compared with those of such a case that a single side of this print head 4 is irradiated. As a result, the high image quality recording operation and the highspeed recording operation can be further achieved. Also, the light sources 5 may be arranged by not a single lateral column, but by a single longitudinal column. Alternatively, as shown in FIG. 8, the light sources 5 may be arranged in three columns, or may be properly arranged. When the optical sources 5 are arranged as shown in FIG. 8, the optical print head 4 may be made compact.

Also, the LCD shutter element 7 is driven by the DC manner, but may be alternatively driven by an AC manner in the above embodiment mode 1. Also, the LCD shutter element 7 is brought into the transmission state when no voltage is applied thereto. Alternatively, even when the print head 4 is arranged by such that the LCD shutter element 7 is brought into the transmission state when a voltage is applied thereto, a similar effect may be achieved.

Figure 9:
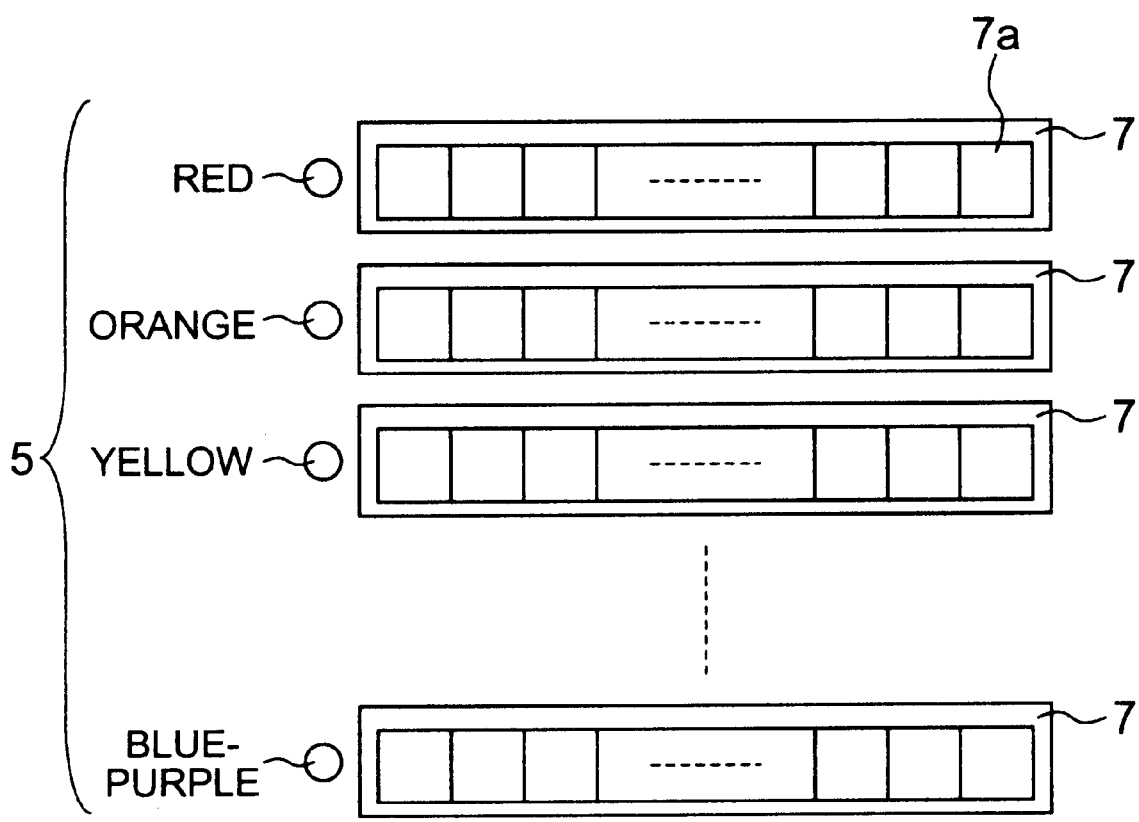
FIG. 9 shows a structural example of another optical print head employed in the optical printing apparatus according to the embodiment mode 1 of the present invention.

Moreover, as shown in FIG. 9, plural columns of the LCD shutter elements 7a may be arranged on the LCD shutter board 7. In this alternative case, the light conducting tube 6 may be provided to every column of the LCD shutter elements in such a manner that the light emitted from the respective light sources 5 does not leak to other LCD shutter element columns. Alternatively, the inside of the light conducting tube 6 may be partitioned as a single chamber. A sequential operation of this alternative case is indicated in FIG. 10.

Figure 10:
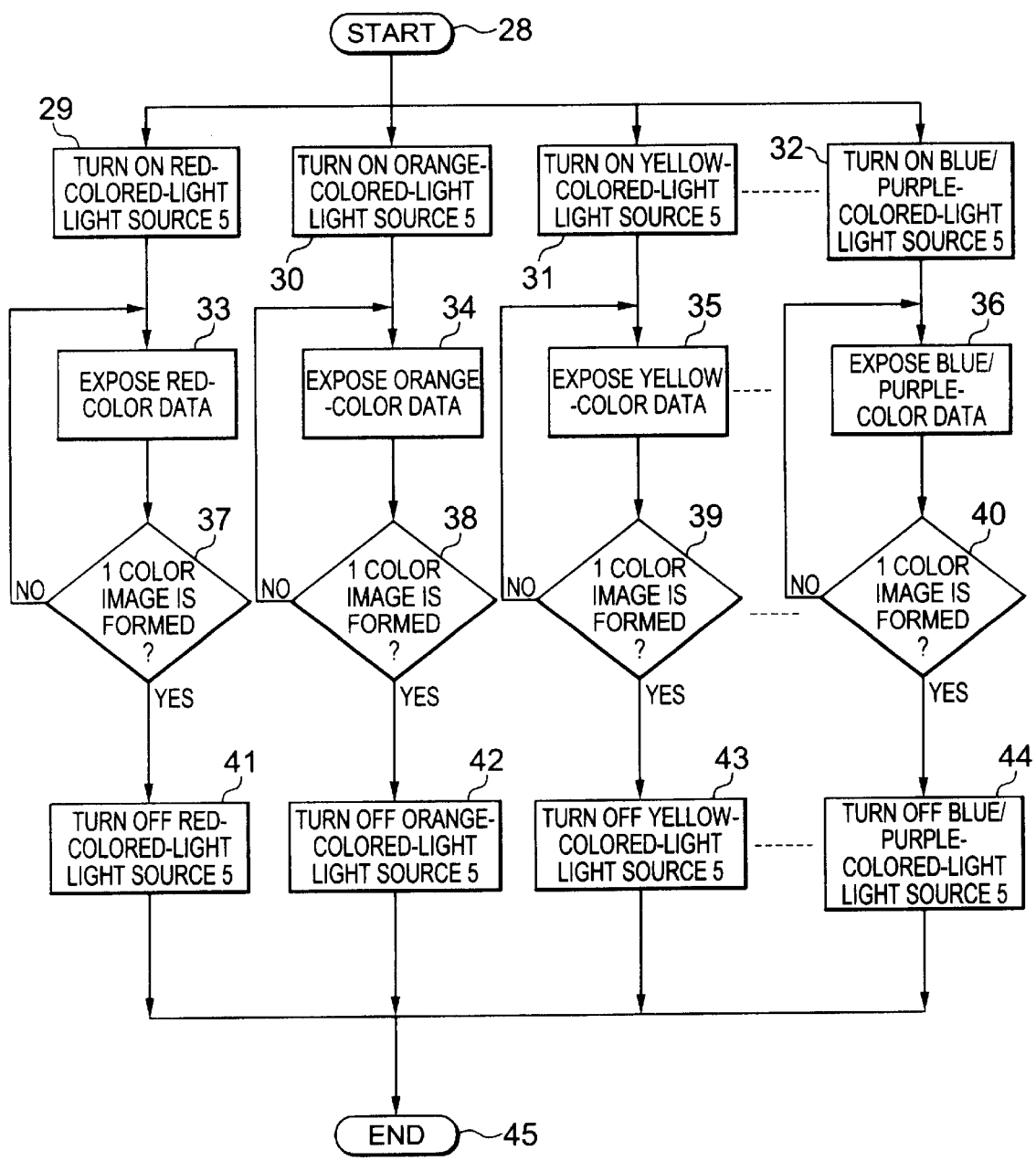
FIG. 10 is a flow chart for explaining another operation of the optical printing apparatus according to the embodiment mode 1 of the present invention.

The process flow operation starts from a step 28 of the sequence diagram shown in FIG. 10. The respective colored-light light sources 5 are turned ON at the same time, or in a preselected order (step 29 to step 32). Subsequently, the respective color data are used to expose the photosensitive recording material (step 33 to step 36). After an image of one color has been formed (step 37 to step 40), the respective colored-light light sources 5 are turned OFF (step 41 to step 44), and then this sequential operation ends at a step 45.

Figure 11:
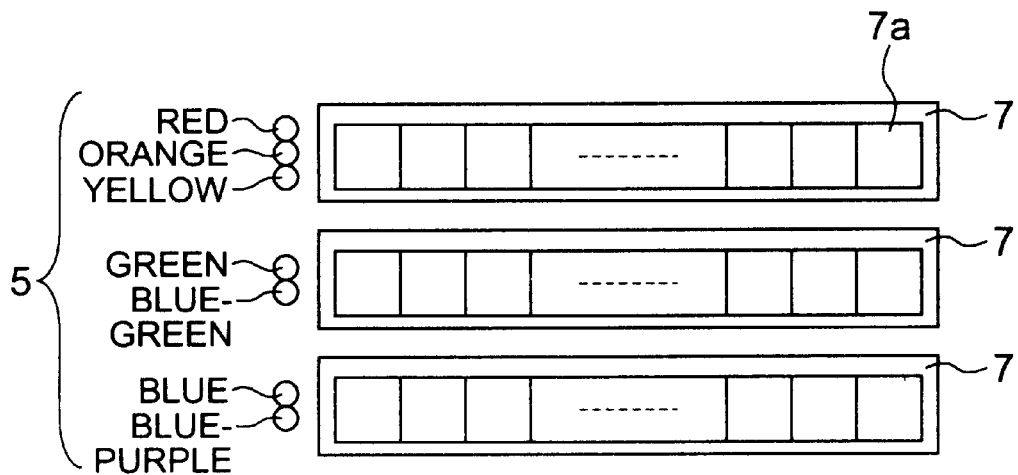
FIG. 11 shows a structural example of another optical print head employed in the optical printing apparatus according to the embodiment mode 1 of the present invention.

In the above case, since the exposure operations for the respective color data can be performed at the same time, there is a merit that highspeed printing operation can be realized. It should also be noted that the interval between the LCD shutter element columns corresponding to the respective colors may be freely set, and the exposure timing for the respective color data may be determined in accordance with the above-explained interval. In addition, as shown in FIG. 11, while a plurality of LCD shutter element columns are employed, the total number of which is smaller than that of the plural light sources 5, these plural light sources 5 may be switched. In this alternative arrangement, there are two merits in the highspeed printing operation and the low cost. The sequential operation may be realized by combining the above-explained sequential operations shown in FIG. 5 and FIG. 10.

EMBODIMENT MODE 2

Figure 12:
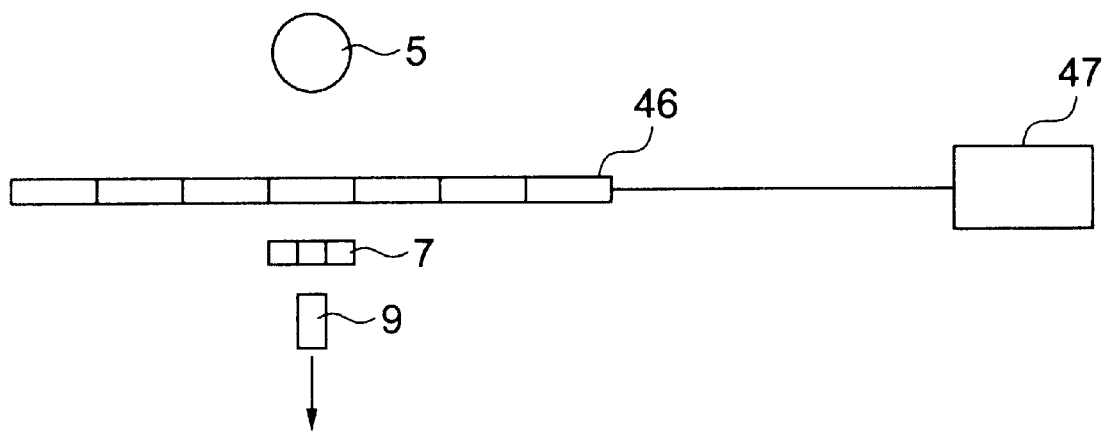
FIG. 12 is a structural diagram of an optical print head employed in an optical printing apparatus according to an embodiment mode 2 of the present invention.

Referring now to drawings, an optical printing apparatus according to an embodiment mode 2 of the present invention will be described. FIG. 12 shows a sectional view of an optical head employed in the optical printing apparatus according to this embodiment mode 2 of the present invention.

In FIG. 12, reference numeral 5 shows a white-light light source, and reference numeral 46 represents a color filter through which red, orange, yellow, green, blue-green, blue, and blue-purple light may be penetrated. Also, reference numeral 47 indicates filter transporting means for transporting the color filter 46 in such a way that desirable colored light may pass through this color filter 46. A single column of LCD shutter element is arranged on an LCD (liquid crystal display) shutter board 7 in a line shape. The colored light is selectively exposed on a photosensitive recording medium via a SELFOC lens 9. The entire arrangement of this second optical printing apparatus is featured by changing the portion of the optical print head 4 from the basic arrangement (FIG. 1) of the embodiment mode 1.

Next, a description will now be made of printing operation by the optical printing apparatus according to this embodiment mode 2 with reference to drawings.

Figure 13A:
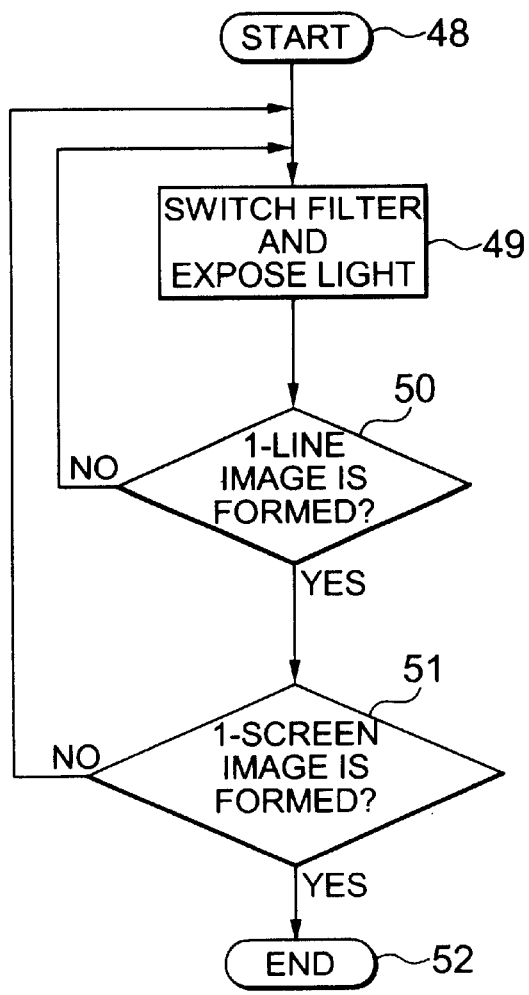
FIGS. 13A and 13B are flow charts for describing an operation of an optical printing apparatus according to the embodiment mode 2 of the present invention.

FIG. 13A is a flow chart for explaining a sequential operation of this second optical printing apparatus. At a first step 48, this sequential operation is commenced. At this step 48, the light source 5 is turned ON. At the next step 49, the red color filter 46 is transported to the upper portion of the LCD shutter board 7 by driving the filter transporting means 47, and also the exposure operation corresponding to the red-color data is selectively performed. Next, the color filter 46 is switched at a step 49 and a step 50, and at the same time, the exposure operations corresponding to the respective color data are selectively carried out. As a result, an image forming operation for 1 line is completed. Then, a similar process operation is repeatedly carried out (step 51), and then this sequential operation is accomplished (step 52).

As previously described, in accordance with this embodiment mode 2, since more than 4 sorts of spectral image data are entered into the optical printing apparatus so as to form the desirable image in response to the spectral image data, there is such an effect that the high image quality recording operation can be carried out, especially, the realistic image having the material feeling can be printed out. Furthermore, since both the white-light light source 5 and the color filter 46 are employed, there is another merit that the second optical printing apparatus can be arranged in low cost.

Figure 13B:
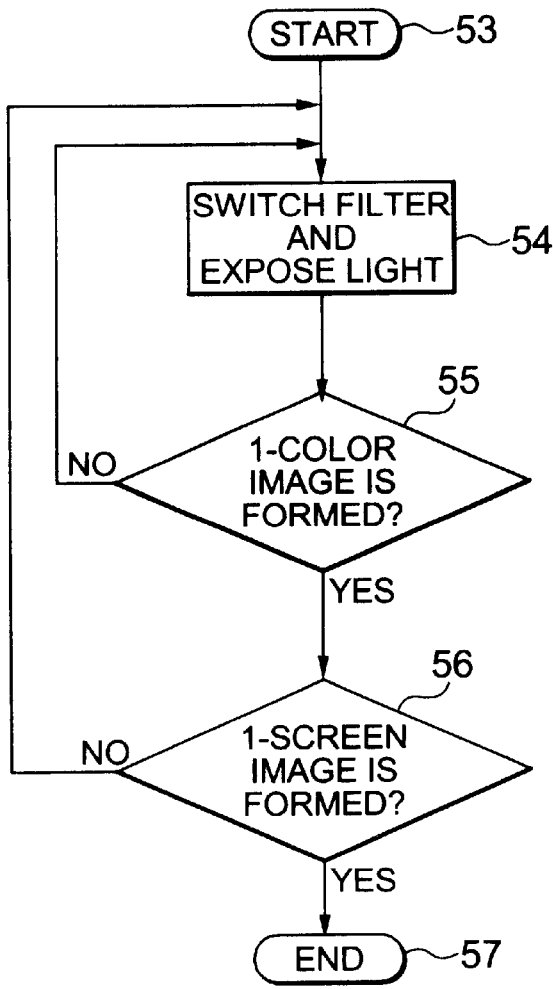

Similar to the above-explained embodiment mode 1, various modifications, changes, and substitutions may be made in this embodiment mode 2 without departing from the technical spirit and scope of the present invention. In addition, the spectral image data are exposed, while the color filters 46 are switched every 1 line in the embodiment mode 2. As shown in FIG. 13B, the color filters 4 may be switched every plural lines, and also the color filters 4 may be alternatively switched in such a manner that after the exposure operation for one color has been completed, the exposure operation for another color may be carried out.

Figure 14:
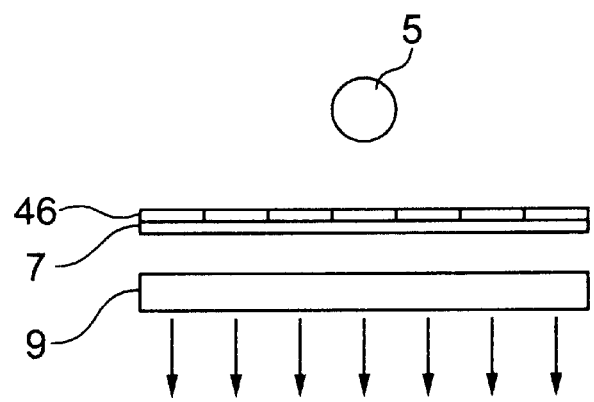
FIG. 14 is a structural diagram of another optical print head provided in the optical printing apparatus according to the embodiment mode 2 of the present invention.

Alternatively, as illustrated in FIG. 14, the second optical printing apparatus may be arranged by employing a plurality of LCD shutter element columns and the color filters 46. Since this alternative arrangement is realized in such a manner that the sorts of color filters 46 and a total number of LCD shutter element columns are made coincident with the sort of spectral image data, simultaneous exposure operations may be realized, so that more highspeed printing operation may be carried out. Also, in the above alternative arrangement of FIG. 14, an optical lens system may be interposed between the white-light light source 5 and the color filter 46, and also a total number of white-light light sources 5 may be increased. Furthermore, when a plurality of color filters 46 are provided, these color filters 46 may at least have different peak wavelengths.

EMBODIMENT MODE 3

Figure 15:
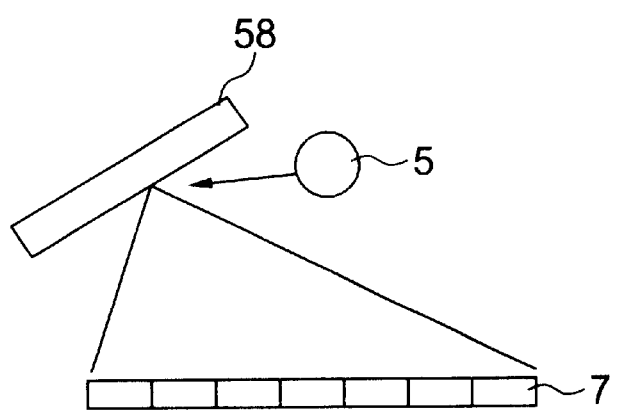
FIG. 15 is a structural diagram of an optical print head employed in an optical printing apparatus according to an embodiment mode 3 of the present invention.

Referring now to drawings, an optical printing apparatus according to an embodiment mode 3 of the present invention will be described. FIG. 15 shows an arrangement of an optical head employed in the optical printing apparatus according to this embodiment mode 3 of the present invention.

In the optical printing apparatus of FIG. 15, a plurality of colors are produced by employing a diffraction grating 58. A groove is formed on the surface of this diffraction grating 58. When the white light emitted from the white-light light source 5 is irradiated on this surface of the diffraction grating 58, this white light is separated into a plurality of colored light, which is equivalent to an employment of a plurality of light sources. It should be noted that the LCD shutter board 7 contains 7 columns of LCD shutter arrays.

Next, printing operation of the optical printing apparatus according to the embodiment mode 3 will now be explained. When the white-light light source 5 is turned ON, the white light emitted from the white-light light source 5 is solved into a plurality of colored light by the diffraction grating 58, and then the plural colored light is irradiated onto the LCD shutter board 7. At this time, both the diffraction grating 58 and the LCD shutter board 7 are previously arranged in such a manner that the red-colored light, the orange-colored light, the yellow-colored light, the green-colored light, the blue/green-colored light, the blue-colored light, and the blue/purple-colored light are irradiated onto the respective LCD shutter element columns of the LCD shutter board 7. The light irradiated onto the LCD shutter board 7 is used to form a desirable image by selectively ON/OFF-driving the LCD shutter elements in response to the spectral image data.

Figure 16:
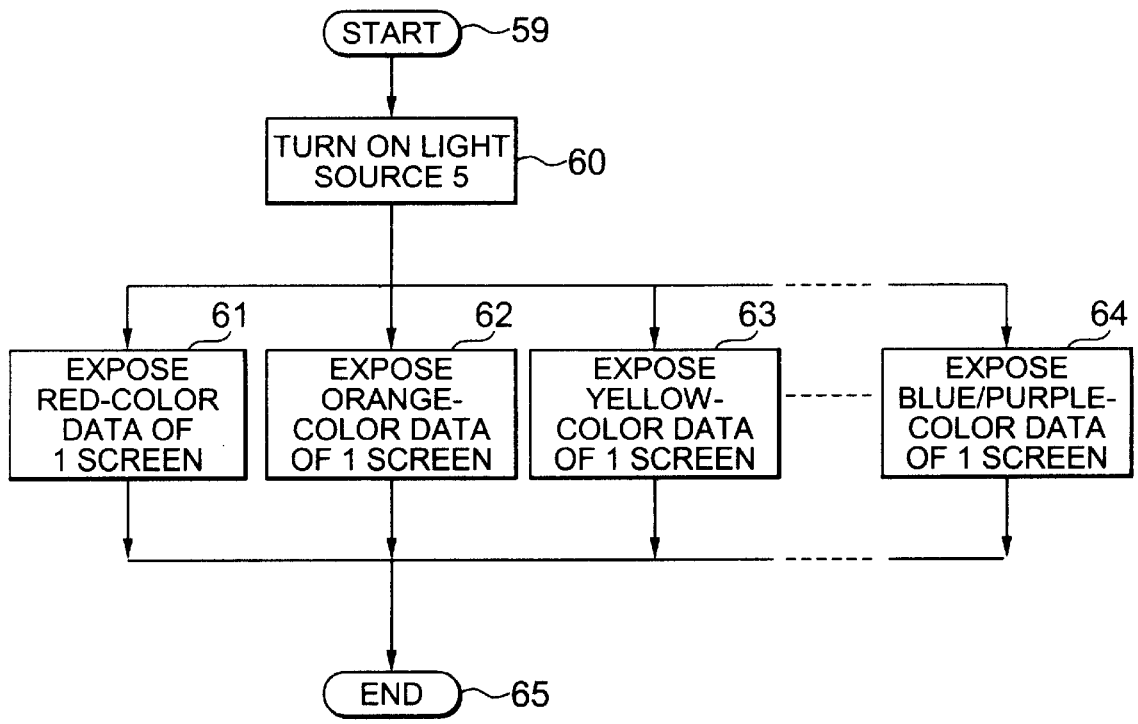
FIG. 16 is a flow chart for describing an operation of an optical printing apparatus according to the embodiment mode 3 of the present invention.

FIG. 16 shows a sequential operation of the optical printing apparatus according to this embodiment mode 3. In FIG. 16, this sequential operation starts at a step 59. After the light source 5 is turned ON at a step 60, the exposure operations corresponding to the respective color image data are carried out (step 61 to step 64), so that a desirable image may be formed. Then, the light source 5 is turned OFF to accomplish this sequential operation (step 65).

As previously described, in accordance with this embodiment mode 3, since more than 4 sorts of spectral image data are entered into the optical printing apparatus so as to form the desirable image in response to the spectral image data, there is such an effect that the high image quality recording operation can be carried out, especially, the realistic image having the material feeling can be printed out. Furthermore, since the white-light light source 5 and the diffraction grating 58 are employed, this optical printing apparatus can be arranged in low cost.

Figure 17:
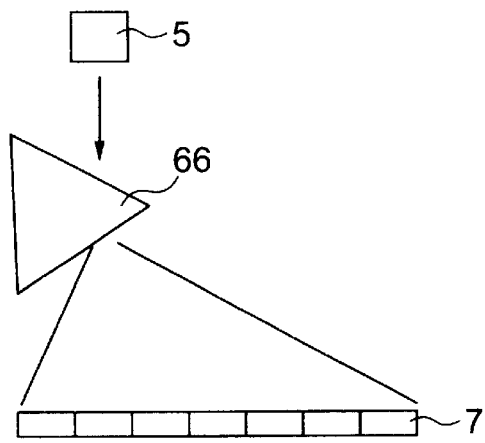
FIG. 17 is a structural diagram of another optical print head provided in the optical printing apparatus according to the embodiment mode 3 of the present invention.

Similar to the above-explained embodiment modes 1 and 2, various modifications, changes, and substitutions may be made in this embodiment mode 3 without departing from the technical spirit and scope of the present invention. For instance, even when a prism 66 is employed instead of the diffraction grating 58 as shown in FIG. 17, a similar effect may be achieved. It should also be noted that a guide (not shown) may be provided in order that the light emitted from the white-light light source 5 is not directly irradiated onto the LCD shutter board 7. Also, optical lenses may be provided between the white-light light source 5 and the diffraction grating 58 (prism 66), and between the diffraction grating 58 (prism 66) and the LCD shutter board 7. Many other modifications may be carried out.

EMBODIMENT MODE 4

Figure 18A:
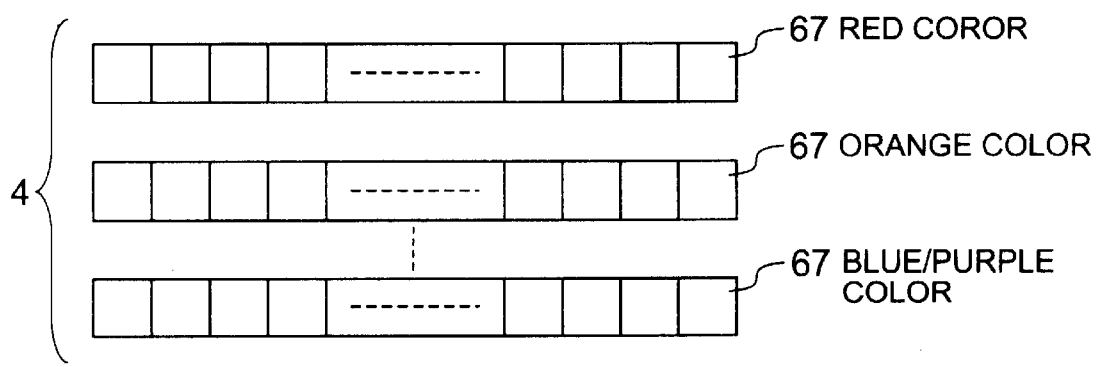
FIGS. 18A and 18B are structural diagrams of an optical print head employed in an optical printing apparatus according to an embodiment mode 4 of the present invention.
Figure 18B:
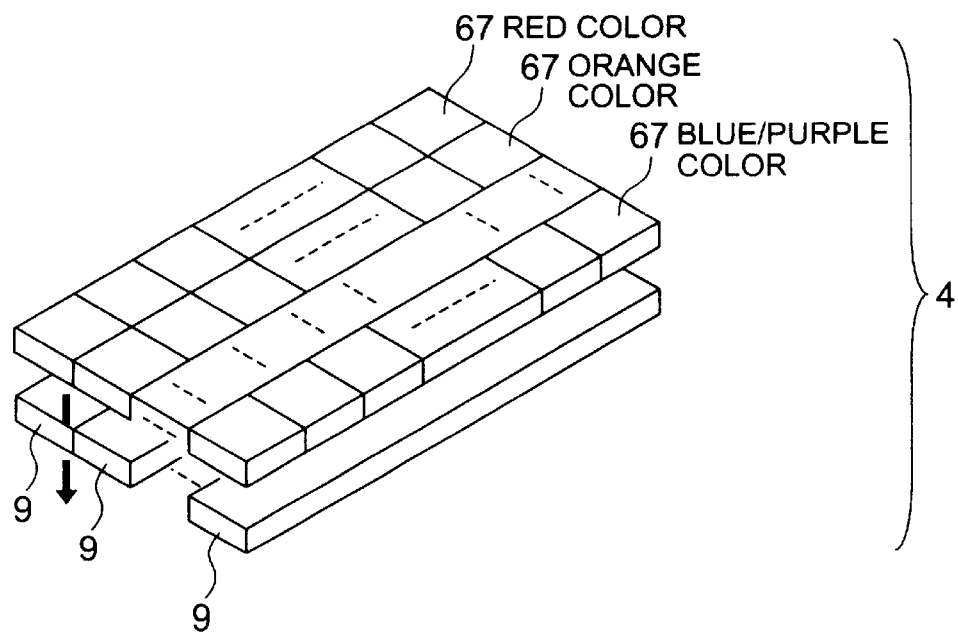

Referring now to FIG. 18, an optical printing apparatus according to a embodiment mode 4 of the present invention will be described. FIG. 18 shows a structure of an optical head 4 employed in the optical printing apparatus according to this embodiment mode 4 of the present invention. FIG. 18A is a plan view of this optical print head 4, and FIG. 18B is a perspective view thereof. In this optical print head 4 of FIG. 18, a self-light emitting element 67 such as an LED and an EL is arranged in a line shape without employing the above-explained LCD shutter board 7.

Next, printing operation of the optical printing apparatus according to this embodiment mode 4 will now be described with reference to FIG. 1 and FIG. 18. This printing operation is substantially similar to that of the embodiment mode 1. In FIG. 18, first of all, spectral image data are inputted into the image data input means 1. These spectral image data correspond to red, orange, yellow, green, blue-green, blue, and blue-purple colors. These spectral image data are sequentially stored into the storage means 2 in response to an instruction issued from a control means (not shown).

Next, the spectral image data stored in the storage means 2 are supplied to the head driving means 3 in response to an instruction issued from the control means (not shown) in such a supply order that the red-color data (equivalent to 640 pixels), the orange-color data, the yellow-color data, the green-color data, the blue-green-color data, the blue-color data, and also the blue-purple-color data. Next, the head driving means 3 converts the above-explained spectral image data into preselected exposure time periods, and ON/OFF-drives the optical print head 4 in response to the converted exposure time periods. In this optical head 4, the self-light emitting elements 67 are arranged in an array shape, and correspond to the respective spectral image data of the red, orange, yellow, green, blue-green, blue, and blue-purple colors. Since the respective self-light emitting elements 67 emit desirable color light, a realistic image can be formed by this fourth optical printing apparatus.

As previously described, in accordance with this embodiment mode 4, since more than 4 sorts of spectral image data are entered into the optical printing apparatus so as to form the desirable image in response to the spectral image data, there is such an effect that the high image quality recording operation can be carried out, especially, the realistic image having the material feeling can be printed out. Also, since a plurality of light-emitting elements 67 are provided, there is such a merit that the optical printing apparatus can be furthermore made compact.

Similar to the above-explained embodiment modes 1 to 3, various modifications, changes, and substitutions may be made in this embodiment mode 4 without departing from the technical spirit and scope of the present invention. For instance, the array intervals among the self-light emitting elements 67 may be freely set. Alternatively, a plurality of arrays may be formed on the same board. Otherwise, a plurality of arrays having separate different structures may be provided. Furthermore, the array interval of the self-light emitting elements 67 may be narrowed, so that these self-light emitting elements 67 may be commonly covered by a single SELFOC lens 9. The present invention is not especially limited to the above modifications. In addition, a small microlens may be used in place of the SELFOC lens 9, or the SELFOC lens 9 itself may be eliminated. This structure can also be applied to FIG. 2.

EMBODIMENT MODE 5

A description will now be made of an optical printing apparatus according to an embodiment mode 5 of the present invention. This embodiment mode 5 is featured by that either self-light emitting elements 67 or LCD shutter elements are arranged in a stagger shape.

Figure 19:
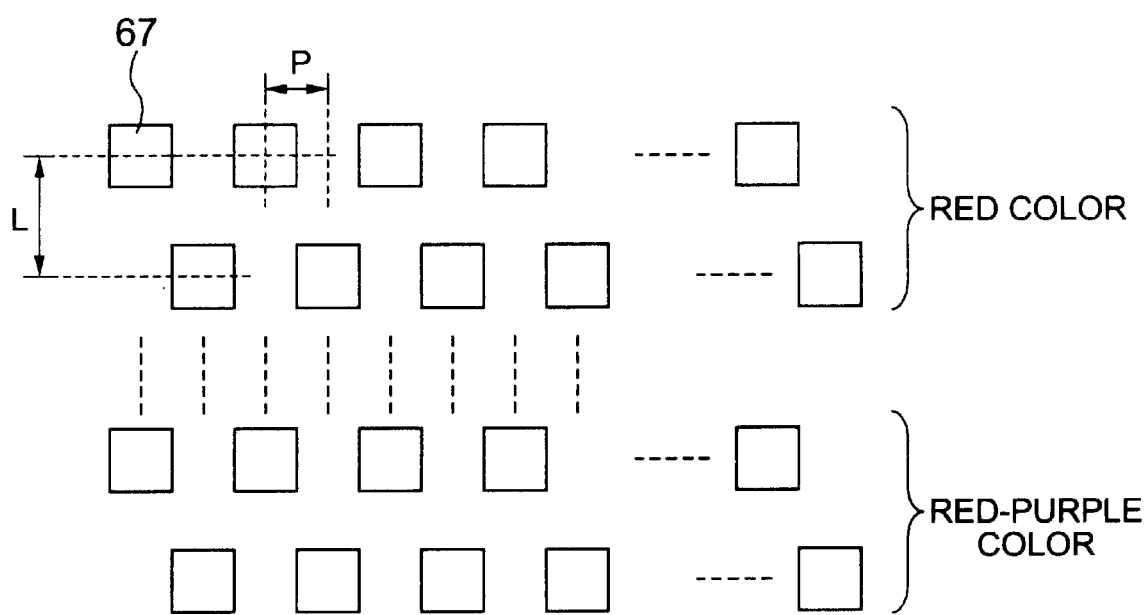
FIG. 19 is a structural diagram of an optical print head provided in the optical printing apparatus according to an embodiment mode 5 of the present invention.

FIG. 19 represents an arrangement of either the self-light emitting elements 67 or the LCD shutter elements, which constitute the optical print head 7. In FIG. 19, symbol "P" shows an arranging pitch of either the LCD shutter elements or the self-light emitting elements 67, and symbol "L" represents an interval between an even-numbered element column and an odd-numbered element column. In this case, the arranging pitch "P" corresponds to resolution. For example, in the case of 300 DPI (Dot Per Inch), the resulting resolution becomes approximately 85 $\mu$m. On the other hand, the value of this interval "L" may be determined as any arbitrary value obtained by multiplying the arranging pitch P by, for example, 2 or 1.5. It should be noted that the drive timing of the optical print head 4 may be determined by this interval "L" value.

The reason why the LCD shutter element (otherwise, self-light emitting elements 67) is arranged in the stagger shape is given as follows: That is, if the LCD shutter elements (or, self-light emitting elements 67) are arranged along one column, then there is such a problem that a black stripe and/or a white stripe may be readily produced in a recorded image, which is caused by a space defined between the LCD shutter element (self-light emitting element) and the LCD shutter element (self-light emitting element) positioned adjacent thereto. This space is caused by the aperture efficiency and the electrode arrangement. Therefore, since the LCD shutter elements (or, self-light emitting elements 67) are arranged in the stagger shape, this problem can be solved.

Furthermore, in such a case that the LCD shutter elements (or, self-light emitting elements 67) are arranged in such a manner that the LCD shutter elements are arranged along at least the main scanning direction are overlapped with each other, it is possible to form an image having a higher image quality. This is because the fluctuations caused by the errors occurred in the drive system and the electric system when the recorded image is formed can be largely reduced by relatively moving the photosensitive recording medium and the print head 4, and also the black stripe can be eliminated by relatively moving the photosensitive recording medium and the print head 4.

Next, printing operation of the optical printing apparatus according to this embodiment mode 5 will now be described with reference to FIG. 1 and FIG. 19. This printing operation is substantially similar to that of the embodiment mode 1. In FIG. 19, first of all, spectral image data are inputted into the image data input means 1. These spectral image data correspond to red, orange, yellow, green, blue-green, blue, and blue-purple colors. These spectral image data are sequentially stored into the storage means 2 in response to an instruction issued from a control means (not shown).

Next, the spectral image data stored in the storage means 2 are supplied to the head driving means 3 in response to an instruction issued from the control means (not shown) in such a supply order that the red-color data (equivalent to 640 pixels), the orange-color data, the yellow-color data, the green-color data, the blue-green-color data, the blue-color data, and also the blue-purple-color data. Next, the head driving means 3 converts the above-explained spectral image data into preselected exposure time periods, and ON/OFF-drives the optical print head 4 in response to the converted exposure time periods. In this optical head 4, the self-light emitting elements 67 are arranged in a stagger array shape, and correspond to the respective spectral image data of the red, orange, yellow, green, blue-green, blue, and blue-purple colors. Since the respective self-light emitting elements 67 emit desirable color light, a realistic image can be formed by this fourth optical printing apparatus.

As previously described, in accordance with this embodiment mode 5, since more than 4 sorts of spectral image data are entered into the optical printing apparatus so as to form the desirable image in response to the spectral image data, there is such an effect that the high image quality recording operation can be carried out, especially, the realistic image having the material feeling can be printed out. Also, since either the self-light emitting elements 67 or the LCD shutter elements are arranged in the stagger shape, there is another merit that the optical printing apparatus can further produce the desirable image with the higher image quality.

Similar to the above-explained embodiment modes 1 to 4, various modifications, changes, and substitutions may be made in this embodiment mode 5 without departing from the technical spirit and scope of the present invention. For instance, the array intervals among the self-light emitting elements 67 may be freely set. Alternatively, a plurality of arrays may be formed on the same board. Otherwise, a plurality of arrays having separate different structures may be provided. In addition, there is no limitation in the color arranging order. For example, after 7 columns of odd-numbered elements are arranged, 7 columns of even-numbered elements may be arranged. Alternatively, while red-colored elements are arranged in an odd-numbered column and an even-numbered column, orange-colored elements may be arranged in an even-numbered column and an odd-numbered column.

EMBODIMENT MODE 6

A description will now be made of an optical printing apparatus according to an embodiment mode 6 of the present invention. This embodiment mode 6 is featured by that more than 3 sorts of spectral image data are entered so as to form a desirable image in response to the entered spectral image data. In particular, in order to solve a narrowed color representative characteristic and insufficient exposure, a plurality of light sources having different peak wavelengths from each other within the same color system are provided or a plurality of light beams are outputted. When the respective wavelength ranges corresponding to the spectral image data are short, the above-explained color representative characteristic becomes narrow.

Figure 20A:
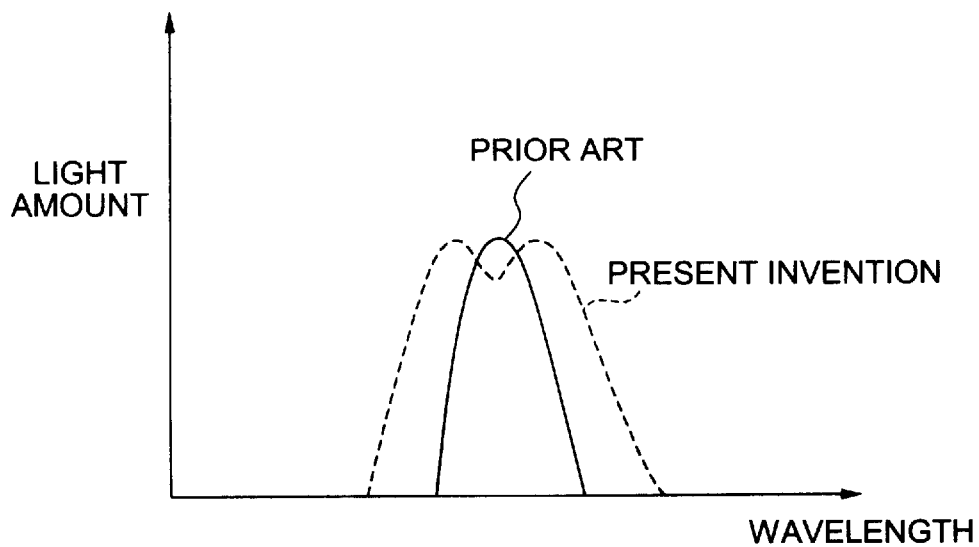
FIGS. 20A, 20B represent a relationship between a light amount and a wave length, and is a structural diagram for indicating an optical print head employed in an optical printing apparatus according to an embodiment mode 6 of the present invention.

FIG. 20A represents a relationship between a light amount and a wavelength in the case that, for example, LEDs (light emitting diodes) are employed in the plural light sources. In this embodiment mode 6, since a plurality of light sources having different peak wavelengths from each other are employed, it is possible to obtain a wide wavelength range which is required in light exposure operation.

Figure 20B:
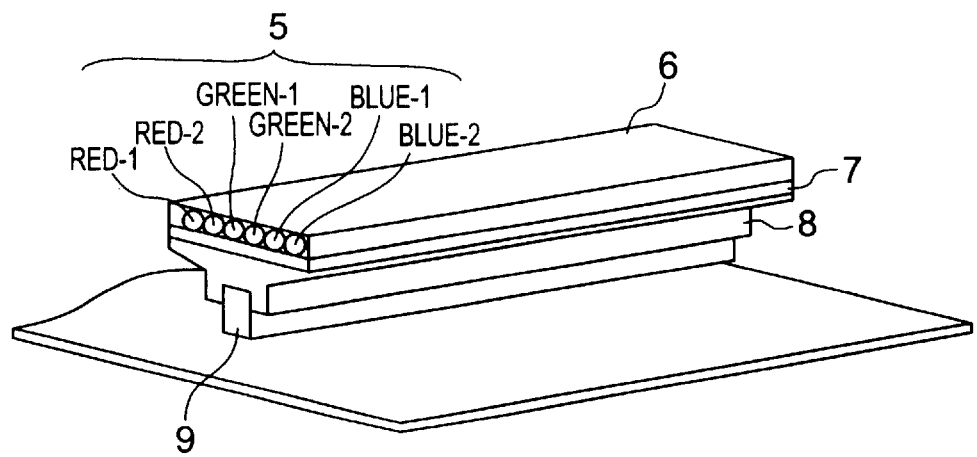

FIG. 20B indicates an optical print head 4 employed in the optical printing apparatus according to this embodiment mode 6. This optical print head 4 contains a light source 5 constituted by red-1 and red-2 light-sources having different peak wavelengths, green-1 and green-2 light-sources having different peak wavelengths, and blue-1 and blue-2 light-sources having different peak wavelengths.

Next, printing operation of the optical printing apparatus according to this embodiment mode 6 will now be described with reference to FIG. 1 and FIG. 20. This printing operation is substantially similar to that of the embodiment mode 1. First of all, spectral image data are inputted into the image data input means 1. These spectral image data correspond to red, green, blue. These spectral image data are sequentially stored into the storage means 2 in response to an instruction issued from a control means (not shown).

Next, the spectral image data stored in the storage means 2 are supplied to the head driving means 3 in response to an instruction issued from the control means (not shown) in such a supply order that the red-color data (equivalent to 640 pixels), the green-color data, and the blue-color data. Next, the head driving means 3 converts the above-explained spectral image data into preselected exposure time periods, and ON/OFF-drives the optical print head 4 in response to the converted exposure time periods. In this optical head 4, there are provided the red-1 and red-2 light sources having different peak wavelengths, the green-1 and green-2 light sources having different peak wavelengths, and the blue-1 and blue-2 light sources having the different peak wavelengths. When the red-colored image data is used to expose the photosensitive recording medium, the red-1 and red-2 light sources 5 are simultaneously turned ON. When the green-colored image data is used to expose the photosensitive recording medium, the green-1 and green-2 light sources 5 are simultaneously turned ON. Also, when the blue-colored image data is used to expose the photosensitive recording medium, the blue-1 and the blue-2 light sources 5 are simultaneously turned ON, so that a desirable image can be formed by this sixth optical printing apparatus.

As previously described, in accordance with this embodiment mode 6, since more than 3 sorts of spectral image data are entered into the optical printing apparatus so as to form the desirable image in response to the spectral image data, and furthermore, a plurality of light sources having the different peak wavelengths within the same color system are used to expose the photosensitive recording material. As a result, there is such an effect that the high image quality recording operation can be carried out.

Similar to the above-explained embodiment modes 1 to 5, various modifications, changes, and substitutions may be made in this embodiment mode 6 without departing from the technical spirit and scope of the present invention. For instance, a total number of these light sources 5 having the different peak wavelengths within the same color system may be selected to be more than 2, and the present invention is not limited thereto. Alternatively, while two sets of green-colored-light light sources 5 are employed, other colored-light light sources 5 may be only one. It should be understood that the light source 5 arranged to have two peak wavelengths can be recognized as such a light source internally constituted by two light sources 5. As a consequence, also in this case, it may be defined to own the two sets of light sources 5. Needless to say, the optical print head 4 using the self-light emitting devices as illustrated in FIG. 18 also has the same effects. In this case, it is appropriate that a plurality of alleys for outputting different peak wavelengths within the same color system be provided. In addition, if a plurality of light sources having different peak wavelengths within the same color system are provided or a plurality of light beams are outputted, these light sources or the light beams may be simultaneously turned ON or outputted, or are sequentially turned ON or outputted with time differences.

EMBODIMENT MODE 7

A description will now be made of an optical printing apparatus according to an embodiment mode 7 of the present invention. This embodiment mode 7 is featured by that more than three sorts of spectral image data are entered so as to form a desirable image in response to the entered spectral image data. In particular, a plurality of light intensity levels with different peak wavelengths within the same color system are made different.

Figure 21A:
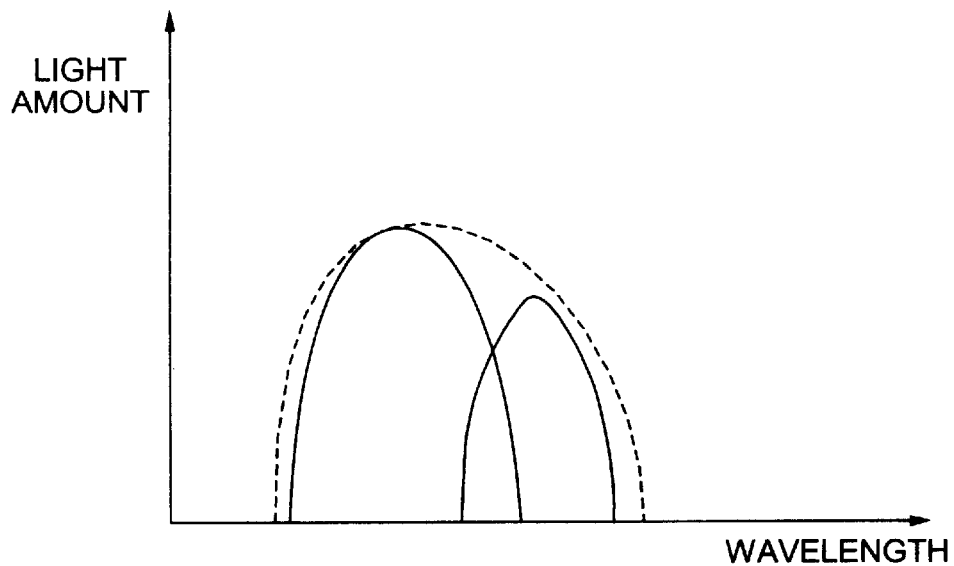
FIGS. 21A and 21B are illustrations for showing a relationship between a light amount (intensity) and a wavelength when an LED is employed as a light source in an optical printing apparatus according to an embodiment mode 7 of the present invention, and also for showing an arrangement of head driving means.

FIG. 21A represents a relationship between a light amount (an intensity) and a wavelength in the case that, for example, LEDs are employed in the plural light sources. In FIG. 21A, the area defined by a dotted line represents the characteristic of the photosensitive recording medium while the area defined by a solid line represents the characteristic of the light sources (in an example of two light sources). In general, a relationship between a light amount and a wavelength in a photosensitive recording medium exhibits a characteristic depicted by curve but not rectangle. Therefore, if a plurality of light sources having different peak wavelengths are outputted with the same light amount, power consumes (since the upper portion beyond the area defined by a dotted line indicates undesirable power).

If different light intensity levels are employed to output light having characteristics near to those of the photosensitive recording medium, power may be saved and high image quality recording operation can also be realized in view of color representative characteristic. Further, since the light approximated to the characteristic of the photosensitive recording medium is outputted, a realistic image can be formed with less color mixture with other colors.

Figure 21B:
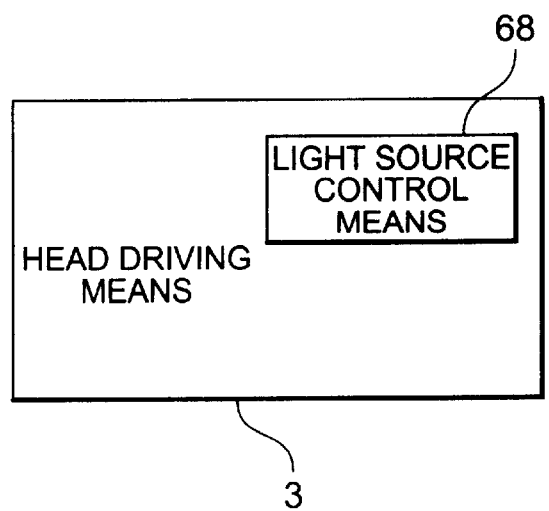
Figure 22:
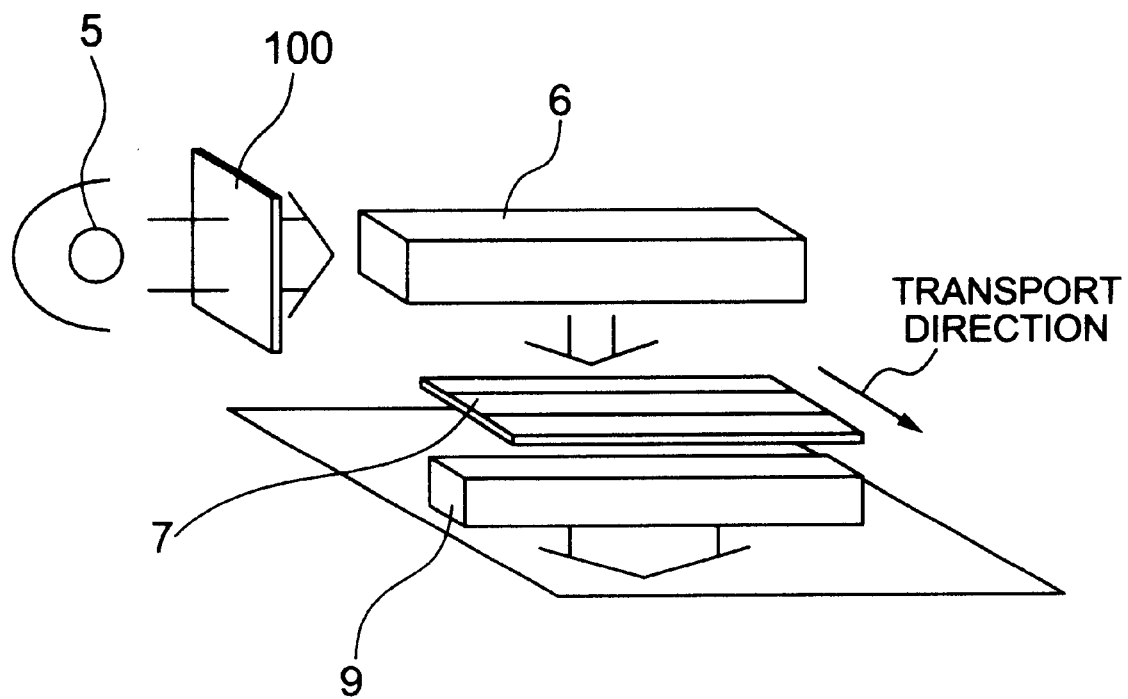
FIG. 22 is an illustration for showing an arrangement of the conventional optical printing apparatus.

Next, printing operation of the optical printing apparatus according to this embodiment mode 7 will now be described with reference to FIG. 1, FIG. 20B and FIG. 21B. In FIG. 21B, first of all, reference numeral 68 denotes light source control means disposed in the head driving means 3 for controlling a light amount for each light source 5. More specifically, a voltage or current is controlled to produce different output light intensity levels.

Similar to the above-explained embodiment mode 1 with respect to operation, spectral image data are inputted into the image data input means 1. These spectral image data correspond to red, green and blue. These spectral image data are sequentially stored in the storage means 2 in response to an instruction issued from a control means (not shown). Then, the spectral image data stored in the storage means 2 are entered into the head driving means 3 as the red-color data (640 pixels), the green-color data and the blue-color data. Further, the head driving means 3 converts the above explained spectral image data into preselected exposure times periods, and drives the optical print head 4.

The optical print head 4 comprises light sources 5 of a red-1 and red-2, a green-1 and green-2, and a blue-1 and blue-2 with different peak wavelengths. When the red-color data is to be exposed, the light sources 5 of the red-1 and the red-2 are simultaneously turned ON. When the green-color data is to be exposed, the light sources 5 of the green-1 and the green-2 are simultaneously turned ON. When the blue-color data is to be exposed, the light sources 5 of the blue-1 and the blue-2 are simultaneously turned ON. Then, the desired image can be formed.

Here, the light sources 5 of the red-1 and the red-2, the green-1 and the green-2, and the blue-1 and the blue-2 are controlled so as to be set to different light amounts, respectively, i.e., these are controlled by the light source control means 68 suitable for the characteristics of the photosensitive recording medium (not shown). For example, relationships between the light sources 5 of the red-1 and the red-2, the green-1 and the green-2, and the blue-1 and the blue-2 are controlled to satisfy red-1 >red-2, green-1=green-2, blue-1 <blue-2. Then, the optimal exposure is performed on the photosensitive recording medium.

As previously described, in accordance with this embodiment mode 7, more than 3 sorts of spectral image data are also entered into the optical printing apparatus and then exposed with different light intensity levels of different peak wavelengths within the same color system. Thus, there is such an effect that the high image quality recording operation can be carried out with low power.

Similar to the above-explained embodiment modes 1 to 6, various modifications, changes, and substitutions may be made in this embodiment mode 7. For instance, while the light source control means 68 is incorporated into the head driving means 3, the light source control means 68 may be independently constructed.

Needless to say, the optical print head 4 using the self-light emitting devices as illustrated in FIG. 18 is also feasible. In this case, it is appropriate that a plurality of alleys for outputting different peak wavelengths within the same color system be provided and be controlled by the head driving means 3 so that the output light intensity levels may be different. In addition, if plural light sources having different peak wavelengths within the same color system are provided or a plurality of light beams are outputted, these light sources or the light beams may be simultaneously turned ON or outputted, or may be sequentially turned ON or outputted with time differences.

Importantly, in the present invention, output light intensity levels are different considering the characteristic of the photosensitive recording medium, various modifications of which may be possible. For instance, without provision of the light source control means 68, individual materials and the individual structure of the light source and the self-light emitting elements result in different light intensity levels. Or, filters and the like may be inserted or adhered to approach the characteristics of the photosensitive recording medium. Note that if the image quality is prior of low power consumption, a light amount for exposure may be set greater (upper than the area defined by a dotted line of FIG. 21A) over the characteristics of the photosensitive recording medium. There is no special limitation if plural light intensity levels exist.

What is claimed is:

1. An optical printing apparatus for selectively exposing light with respect to a photosensitive recording medium to thereby form a gradation image thereon, comprising:

image data input means for entering more than 4 colors of spectral image data;

storage means for storing thereinto said entered spectral image data;

an optical head for outputting more than 4 sorts of light having different wavelengths from each other; and head driving means for converting said stored spectral image data into predetermined exposure time periods to drive said optical print head.

2. An optical printing apparatus as claimed in claim 1 wherein:

said optical print head contains more than 4 sorts of light sources having different peak wavelengths from each other.

3. An optical printing apparatus as claimed in claim 1 wherein:
said optical print head includes a white-light light source, and a color filter for penetrating therethrough more than 4-colors light emitted from said white-light light source.

4. An optical printing apparatus as claimed in claim 1 wherein:
said optical print head includes a white-light light source, and an optical element for spectral-dividing the white light emitted from the white-light light source into more than 4-colors light.

5. An optical printing apparatus as claimed in claim 1 wherein:
said optical print head includes self-light emitting elements arranged in an array shape in correspondence with said spectral image data.

6. An optical printing apparatus as claimed in claim 1 wherein:
light emitted from an exposure light source is arranged in a stagger shape.

7. An optical printing apparatus as claimed in claim 1 wherein:
said optical print head contains a TN (twisted nematic) type light transmission control element for selectively exposing the light with respect to said photosensitive recording medium.

8. An optical printing apparatus or selectively exposing light with respect to a photosensitive recording medium to thereby form a gradation image thereon, comprising:
image data input means for entering more than 3 colors of spectral image data;
storage means for storing thereinto said entered spectral image data;
an optical print head containing a plurality of light sources having different peak wavelengths within the same color system, such that said optical print head utilizes multiple light sources that have different peak wavelengths to create each of said colors; and
head driving means for converting said stored spectral image data into predetermined exposure time periods to drive said optical print head.

9. An optical printing apparatus as claimed in claim 8 wherein:
said optical print head contains a TN (twisted nematic) type light transmission control element for selectively exposing the light with respect to said photosensitive recording medium.

10. An optical printing apparatus as claimed in claim 8 wherein said optical print head for outputting a plurality of light beams having different peak wavelengths within the same color system has different light intensity levels.

11. An optical printing apparatus for selectively exposing light with respect to a photosensitive recording medium thereby forming a gradation image thereon, the apparatus comprising:
an optical print head outputting more than four types of light, each of the more than four types of light having different wavelengths; and
a processor, the processor having a memory, the processor configured to:
receive spectral image data associated with the more than four types of light;
store the received spectral image data in the memory; and
convert the stored spectral image data into a set of predetermined exposure time periods to drive the optical print head.

12. The optical printing apparatus according to claim 11, wherein the optical print head comprises more than four light sources, each of the more than four light sources having different peak wavelengths.

13. The optical printing apparatus according to claim 11, wherein the optical print head comprises a white light source and a color filter for filtering more than four colors of light emitted from the white light source.

14. The optical printing apparatus according to claim 11, wherein the optical print head comprises a white light source and an optical element for spectrally dividing the white light emitted from the white light source into more than four colors of light.

15. The optical printing apparatus according to claim 11, wherein the optical print head comprises self-light emitting elements arranged in an array in correspondence with the spectral image data.

16. The optical printing apparatus according to claim 11, further comprising an exposure light source arranged such that light emitted therefrom is correspondingly arranged in a stagger shape.

17. The optical printing apparatus according to claim 11, wherein the optical print head contains a twisted nematic (TN) type light transmission control element for selectively exposing a light with respect to the photosensitive recording medium.

18. An optical printing apparatus for selectively exposing light with respect to a photosensitive recording medium to thereby form a gradation image thereon, the optical printing apparatus comprising:
an optical print head containing a plurality of light sources having different peak wavelengths within a same color system; and
a processor coupled to the optical print head, the processor having a memory, the processor configured to:
receive spectral image data associated with more than three colors;
store the spectral image data in the memory; and
convert the stored spectral image data into predetermined exposure time periods to drive the optical print head,
wherein said optical print head utilizes multiple light sources that have different peak wavelengths to create each of said colors.

19. The optical printing apparatus according to claim 18, wherein the optical print head contains a twisted nematic (TN) type transmission control element for selectively exposing the light with respect to the photosensitive recording medium.

20. The optical printing apparatus according to claim 18, wherein the optical print head further has different light intensity levels.

* * * * *